US 6,705,287 B2

(12) United States Patent
Kuenstler et al.

(10) Patent No.: US 6,705,287 B2
(45) Date of Patent: Mar. 16, 2004

(54) METHOD AND REGULATING ARRANGEMENT FOR HEATING THE CAB OF A MOTOR VEHICLE WITH A DIESEL ENGINE

(75) Inventors: Johannes Kuenstler, Aachen (DE); Peter Hills, Leigh-on-sea (GB); Paul Eduard Moraal, Vaals (NL)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 10/103,620

(22) Filed: Mar. 21, 2002

(65) Prior Publication Data

US 2002/0145053 A1 Oct. 10, 2002

(30) Foreign Application Priority Data

Apr. 6, 2001 (EP) .............................. 01108678

(51) Int. Cl.$^7$ .............................. F02D 9/02; F02D 41/06
(52) U.S. Cl. .................... 123/399; 123/142.5 R; 237/12.3 B
(58) Field of Search ...................... 123/142.5 R, 399, 123/400, 401, 403, 568.21; 237/12.3 B

(56) References Cited

U.S. PATENT DOCUMENTS 4,467,601 A * 8/1984 Watanabe ............... 123/403 X
5,735,238 A * 4/1998 Russ et al. ............. 237/12.3 B
6,243,642 B1 * 6/2001 Thomas ...................... 701/113

FOREIGN PATENT DOCUMENTS

| JP | 59-134344 | * 8/1984 |
| JP | 2-267358 | * 11/1990 |
| JP | 11-148376 | 6/1999 |
| JP | 11324819 | 11/1999 |

* cited by examiner

*Primary Examiner*—Tony M. Argenbright
(74) *Attorney, Agent, or Firm*—Allan J. Lippa; Kolisch Hartwell, P.C.

(57) ABSTRACT

A method and a regulating arrangement (10) for heating the cab (21) of a vehicle is described. In the event of a start in a cold environment, a heating program is carried out to heat the cab (21) more rapidly, if the diesel engine temperature, measured by a temperature sensor (15), is below a predetermined value. The supply of air to the diesel engine is reduced via the throttle valve (13) to set a currently predetermined intake pressure. If the driver demands a higher acceleration of the vehicle by actuating the accelerator pedal, throttling can be temporarily canceled. When the engine temperature has exceeded a second value, the heating program is terminated and the engine control (10) returns to normal operation. In order to assist the heating phase, in addition, the exhaust-gas recirculation valve (17) may be closed and electrical consumers switched on.

7 Claims, 1 Drawing Sheet

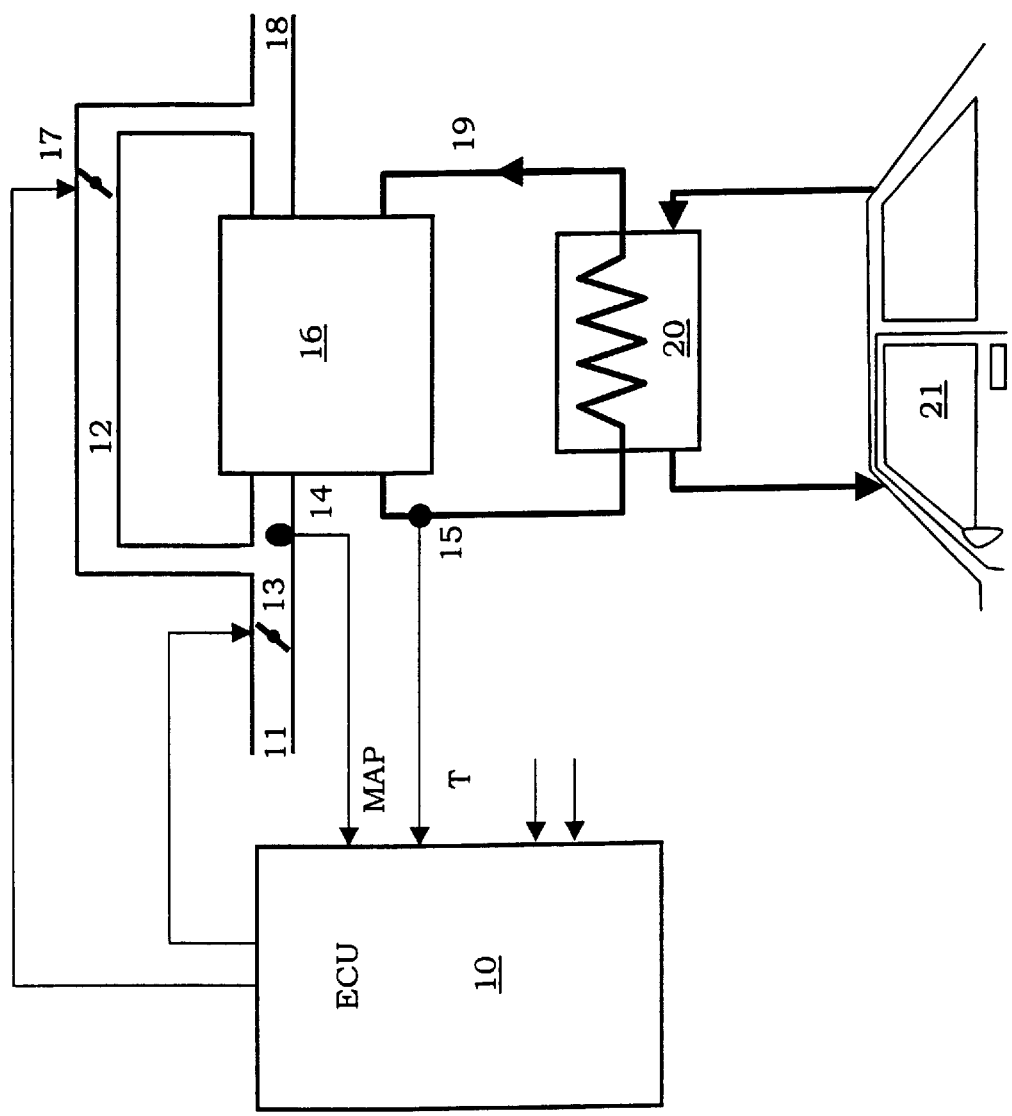

METHOD AND REGULATING ARRANGEMENT FOR HEATING THE CAB OF A MOTOR VEHICLE WITH A DIESEL ENGINE

The invention relates to a method for heating the cab of a motor vehicle with a diesel engine, the cab being supplied with waste heat occurring in the diesel engine. The invention relates, furthermore, to a regulating arrangement for the cab heating and for the diesel engine of a motor vehicle, containing
- a temperature sensor for the temperature of the diesel engine;
- a pressure sensor for the intake pressure of the diesel engine; and
- a controllable throttle valve for the supply of air to the diesel engine.

Heating systems for the cab of a motor vehicle usually obtain their heat energy from the waste heat generated in the internal combustion engine. During the starting of a motor vehicle cooled to a low ambient temperature, the problem arises that heating energy for the cab is available only when the engine has been warmed up. For this reason, additional heating systems are often provided for the cab space and can provide the necessary heat energy in the starting phase of the motor vehicle. One disadvantage of this, however, is the outlay required for the installation and operation of such an additional assembly which, as a rule, is required only for short transitional phases when the vehicle is in operation.

To speed up the warming-up of a diesel engine, it is known from JP 11324819 and JP 11-148375 to throttle or completely close the supply of air to the engine and at the same time allow intensified exhaust-gas recirculation. Intensified recirculation of exhaust gases into the inlet of the diesel engine is in this case to bring about a more rapid rise in the temperature of the engine. The measures mentioned are cut off again after a short time when a predetermined engine rotational speed is reached.

The object of the present invention was, by contrast, to provide a method and a regulating arrangement for a motor vehicle with a diesel engine, which allow the cab of the motor vehicle to be heated more rapidly from the cooled state.

In the method for heating the cab of a motor vehicle with a diesel engine, the cab is supplied with waste heat produced in the diesel engine and the temperature of the diesel engine is measured directly or indirectly. If this measured temperature is below a predetermined first limit value $T_1$, the supply of air to the diesel engine is throttled as a result of a stipulation of a reduced intake pressure MAP_ref, until the directly or indirectly measured temperature of the diesel engine exceeds a predetermined second limit value $T_2$.

The method is thus based, in the first place, on the fact that the temperature of the diesel engine is monitored. If this temperature is below the first limit value $T_1$, the implementation of a special heating program is initiated. In this heating program, a reduced intake pressure MAP_ref is determined and is subsequently set by the throttling of the air supply. As a result of the stipulation of typically greatly reduced intake pressures and a correspondingly high throttling of the air supply, the pumping losses of the engine increase and the total flow rate through the engine is reduced. The two effects contribute considerably to a more rapid warming of the engine, which, in turn, is conducive to the heating of the cab. The vehicle can therefore be heated up more rapidly to temperatures which are pleasant for the occupants. It is thereby possible, under certain circumstances, to dispense with additional heating devices in vehicles which are used in regions of cold climates (for example, Scandinavia, northern USA or Canada).

Various procedures may be envisaged for determining the temperature of the diesel engine. This temperature may be determined, for example, directly via the cylinder-head temperature or else indirectly via the temperature of the coolant which is conducted through the diesel engine.

The value MAP_ref of the reduced intake pressure, which is to be set by the throttling of the air supply, is advantageously fixed by means of a predetermined table store as a function of the temperature of the diesel engine, of the engine rotational speed and/or of the engine load. The intake pressure to be set is therefore not a constant quantity, but is adapted optimally to the operating parameters of the motor vehicle.

According to a development of the method, the predetermined reduced intake pressure MAP_ref is modified as a function of the accelerator pedal position and/or of the rate of change of the accelerator pedal position in relation to MAP_ref_mod, in order to ensure that the motor vehicle has good driving properties. This ensures that the motor vehicle still reacts sufficiently to an actuation of the accelerator pedal by the driver and consequently obeys his wishes as regards driving behavior. The functions referred to may be designed, in particular, in such a way that, when a predetermined threshold value for the accelerator pedal position and/or its rate of change is exceeded, the throttling of the air supply is canceled or reduced, in order to provide the full engine power for the drive.

Furthermore, the predetermined reduced intake pressure MAP_ref is increased preferably when the air/fuel ratio falls below a predetermined minimum. This avoids the situation where the engine changes to an unstable operating state with insufficient control possibilities.

As can be gathered from the statements made above, changes to the predetermined intake pressure are necessary at the beginning and end of the heating program and, in the case of special conditions, also during the implementation of the heating program. These changes are preferably carried out in ramp form. That is to say, the respective old and new values of the intake pressure merge continuously into one another by means of a linear relation. This prevents undesirable abrupt changes in the behavior of the motor vehicle from occurring.

According to another development of the method, the exhaust-gas recirculation (EGR) of the diesel engine is closed if the temperature of the diesel engine is below the first limit value $T_1$. This measure leads to an increased fuel consumption of the diesel engine and consequently to a more rapid rise in its temperature.

As a further conducive measure for warming up the diesel engine, it is possible to switch on electrical loads until the temperature of the diesel engine exceeds a second limit value $T_2$. The connection of electrical consumers increases the load of the diesel engine and thereby contributes to more rapid warming up. Preferably, in this case, those electrical consumers are connected the activity of which cannot be detected by the driver, that is to say, for example, the windshield heating or the glow plugs. When the third temperature limit value is reached, these consumers are switched off or are reset to the value predetermined by the driver.

The invention relates, furthermore, to a regulating arrangement for the cab heating and the diesel engine of a motor vehicle, the regulating arrangement being coupled to a temperature sensor for the temperature T of the diesel engine, to a pressure sensor for the intake pressure MAP of the diesel engine and to a controllable throttle valve for the supply of air to the diesel engine. The regulating arrangement is set up in such a way that it can carry out a method of the type explained above. That is to say, the regulating arrangement measures the temperature T of the diesel engine directly or indirectly via the temperature sensor, and, if this temperature is below a first limit value $T_1$, the supply of air to the diesel engine is reduced via the throttle valve, in such a way that a currently predetermined value MAP_ref for the intake pressure is reached. Adherence to this value for the intake pressure may be checked and regulated via the pressure sensor. By means of a regulating arrangement of this type, a rapid heating of a cooled cab of a motor vehicle is possible, since the diesel engine runs through a speeded-up warm-up stage.

The invention is explained in more detail below by way of example with the aid of the FIGURE.

The single FIGURE shows diagrammatically the components of a regulating arrangement for the cab heating and the diesel engine of a motor vehicle.

Said motor vehicle is driven by a diesel engine 16 which has an inlet manifold 11 for the supply of intake air and an outlet manifold 18 for the discharge of spent exhaust gases. Exhaust-gas recirculation 12 (EGR) from the outlet manifold 18 to the inlet manifold 11 is optionally provided, and the backflow rate can be controlled via an EGR valve 17.

The diesel engine 16 is connected to a coolant circuit 19. The waste heat produced in the diesel engine 16 is absorbed by the coolant of this circuit and transported to the heat exchanger 20 likewise located in the coolant circuit 19. It can be discharged there into the ambient air and, in particular, into a heating-medium circuit which ensures heating of the passenger cab 21 of the motor vehicle.

When the motor vehicle is started in a cold environment, there is the problem that both the cab 21 and the engine 16 are cold. So that waste heat can nevertheless be obtained as quickly as possible from the engine 16 in order to heat the cab 21, the special design and operating mode of the electronic engine control 10 (ECU) which are described below are proposed.

The engine control 10 is connected to a temperature sensor 15 which measures the temperature in the coolant circuit 19. Furthermore, said engine control is connected to a pressure sensor 14 for the intake pressure MAP in the inlet manifold 11. Moreover, the engine control 10 also receives further measurement values (not illustrated) relating to the operating state of the engine and of the vehicle, such as, for example, the engine rotational speed, the accelerator pedal position and the like.

On the output side, the engine control 10 exerts influence, in particular, on the positions of the throttle valve 13 and of the EGR valve 17.

By means of the set-up described, the following method can then be carried out for a speeded-up warm-up phase of the diesel engine 16:

First, during the starting of the motor vehicle, the engine control 10 determines the temperature T of the diesel engine 16 via the temperature sensor 15.

If this temperature T is below a predetermined settable first limit value $T_1$, of, for example, 0° C., the measures listed below are implemented:

a) First, the EGR valve 17 is closed.
b) Then, electrical consumers (not illustrated) are switched on, in order to generate a higher load on the engine 16 and thereby raise the engine temperature. Preferably, consumers, such as the windshield heating or the glow plugs, are switched on, since the driver cannot detect their activity and is therefore not disturbed by them.
c) Then, a predetermined or reference intake pressure MAP_ref is generated from a predetermined calibratable characteristic diagram. Input quantities for this characteristic diagram are the measured engine temperature T, the engine rotational speed, the engine load, and, if appropriate, other engine operating parameters. The reduced reference intake pressure MAP_ref may be very low, for example about 40 to 45 kPa during idling or under low load.

The reference intake pressure MAP_ref is then, if appropriate, converted into a modified intake pressure MAP_ref_mod. This is the case, for example, when the accelerator pedal position or the rate of change of the accelerator pedal position make it necessary during acceleration phases, in order to ensure good driving properties, to reduce the extent of inlet throttling. Furthermore, a modification may take place by an increase in the reference intake pressure MAP_ref when the air/fuel ratio falls below a calibratable minimum.

d) The determined intake pressure MAP_ref or MAP_ref_mod, starting from the current predetermined intake pressure, is set in ramp form over a calibratable period of time, in order to make it possible to have as smooth a transition as possible from the original value to throttled operation.
e) The inlet throttle valve 13 is then actuated by the engine control 10 in such a way that the predetermined intake pressure MAP_ref or MAP_ref_mod is assumed. In this case, in particular, a fault signal between the predetermined intake pressure MAP_ref or MAP_ref_mod and the actual intake pressure MAP may first be weighted by a factor, in order to counteract a pressure shortfall. Subsequently, the weighted fault signal may be fed as an input to a nonlinear PI controller, the amplification factors of the controller depending on the throttle valve position. This dependence of the amplification factors on the throttle valve position serves for taking into account an increased sensitivity of the throttle valve position to the intake pressure when the throttle valve is almost completely closed.

Furthermore, the activated throttle valve 13 may also be opened completely (and the integrator of the PI controller reset to zero) when the rate of change of the accelerator pedal position exceeds a calibratable threshold. This makes it possible to ensure that the driving behavior and driving sensation are not adversely influenced by the heating program.

f) When the measured engine temperature T exceeds a second predetermined limit value $T_2$ which is higher than or equal to the first limit value $T_1$, the throttling of the throttle valve 13 is deactivated, and the engine control 10 returns to its normal operating mode.

The method explained above has the advantage that the exhaust-gas temperature rises and the coolant temperature in the coolant circuit 19 increases more rapidly. This leads to a considerably more rapid heating of the cab 21 and consequently to greater comfort for the passengers after a vehicle start at low ambient temperatures. Additional heating means may therefore, as a rule, be dispensed with in the motor vehicle.

What is claimed is:

1. A method to control heating the cab of a motor vehicle having a diesel engine inducting air therein via a throttle and intake manifold and a heat exchanger transferring exhaust heat from the engine to the cab, comprising:

provicing a temperature indication related to temperature of the diesel engine;

throttling the air inducted into the diesel engine when said temperature indication is below a first limit value;

providing an indication of pressure in the intake manifold;

limiting said throttling when said intake manifold pressure falls below a predetermined intake pressure; and halting said throttling when said temperature exceeds a second limit value.

2. The method recited in claim 1, wherein said temperature is determined via engine coolant temperature.

3. The method recited in claim 1, wherein said temperature is determined via engine cylinder head temperature.

4. The method recited in claim 1, wherein the value of said predetermined intake pressure is fixed from a predetermined table store as a function of the temperature of the diesel engine, of the engine rotational speed, and/or of the engine load.

5. The method recited in claim 1, wherein said predetermined intake pressure is changed as a function of the accelerator pedal position and/or its rate of change, in order to ensure good driving properties.

6. The method recited in claim 1, wherein said predetermined intake pressure is increased when the air/fuel ratio falls below a predetermined minimum.

7. The method recited in claim 1, wherein if said temperature is below said first limit value, electrical loads are switched on until said temperature exceeds a second limit value.

* * * * *